US008247800B2

(12) United States Patent
Wang et al.

(10) Patent No.: US 8,247,800 B2
(45) Date of Patent: Aug. 21, 2012

(54) TRIARYLAMINE CONTAINING POLYMERS AND ELECTRONIC DEVICES

(75) Inventors: Chun Wang, Midland, MI (US); Michael Inbasekaran, Midland, MI (US); Wanglin Yu, Midland, MI (US); Yang Cheng, Midland, MI (US)

(73) Assignee: Sumitomo Chemical Company, Limited, Tokyo (JP)

( * ) Notice: Subject to any disclaimer, the term of this patent is extended or adjusted under 35 U.S.C. 154(b) by 548 days.

(21) Appl. No.: 11/667,106

(22) PCT Filed: Dec. 1, 2005

(86) PCT No.: PCT/US2005/043222
§ 371 (c)(1),
(2), (4) Date: Sep. 12, 2007

(87) PCT Pub. No.: WO2006/060435
PCT Pub. Date: Jun. 8, 2006

(65) Prior Publication Data
US 2008/0011353 A1    Jan. 17, 2008

Related U.S. Application Data

(60) Provisional application No. 60/633,357, filed on Dec. 3, 2004.

(51) Int. Cl.
*H01L 35/24* (2006.01)
(52) U.S. Cl. .................... 257/40; 257/690; 257/E51.001
(58) Field of Classification Search ..................... 257/40, 257/E51.001; 428/690
See application file for complete search history.

(56) References Cited

U.S. PATENT DOCUMENTS

| 5,728,801 | A | 3/1998 | Wu et al. | |
|---|---|---|---|---|
| 5,777,070 | A | 7/1998 | Inbasekaran et al. | |
| 5,874,179 | A | 2/1999 | Kreuder et al. | |
| 5,879,821 | A | 3/1999 | Hsieh et al. | |
| 2004/0054095 | A1* | 3/2004 | Allen et al. | 525/418 |
| 2004/0131886 | A1* | 7/2004 | Marrocco et al. | 428/690 |
| 2004/0253389 | A1* | 12/2004 | Suzuki et al. | 428/1.1 |
| 2005/0106414 | A1* | 5/2005 | Saitoh et al. | 428/690 |
| 2006/0058494 | A1 | 3/2006 | Busing et al. | |
| 2006/0166034 | A1* | 7/2006 | Saitoh et al. | 428/690 |
| 2008/0102312 | A1 | 5/2008 | Parham et al. | |

FOREIGN PATENT DOCUMENTS

| CN | 1199414 | A | 11/1998 |
|---|---|---|---|
| CN | 1337987 | | 2/2002 |
| CN | 1381543 | A | 11/2002 |
| CN | 1419574 | | 5/2003 |
| JP | 11-184109 | A | 7/1999 |
| JP | 2002-080595 | A | 3/2002 |
| JP | 2002-2175883 | A | 6/2002 |
| JP | 2003-147347 | A | 5/2003 |
| JP | 2004059743 | A * | 2/2004 |
| JP | 2004063277 | A * | 2/2004 |
| JP | 2004-067970 | A | 3/2004 |
| JP | 2004099464 | A * | 4/2004 |
| JP | 2004-292782 | A | 10/2004 |
| JP | 2007-509954 | A | 4/2007 |
| WO | WO 99/54385 | A1 | 10/1999 |
| WO | WO 00/46321 | A1 | 8/2000 |
| WO | WO 00/55927 | A1 | 9/2000 |
| WO | WO 01/66618 | A1 | 9/2001 |
| WO | WO 01/81294 | A1 | 11/2001 |
| WO | WO 2004/024670 | A1 | 3/2004 |
| WO | 2004-037887 | A2 | 5/2004 |

OTHER PUBLICATIONS

Machine Translation of JP 2004-059743.*
Machine Translation of JP 2004-063277.*
Machine Translation of JP 2004-099464.*
A.W. Grice, et al. "High brightness and efficiency blue light-emitting polymer diodes", Applied Physics Letters, vol. 73, No. 5, (Aug. 3, 1998), pp. 629-631.
Y. Yang, et al. "Efficient blue-green and white light-emitting electrochemical cells based on poly[9,9-bis(3,6-dioxaheptyl)-fluorene-2,7-diyl]", J. Appl. Phys. 81 (7), Apr. 1, 1997, pp. 3294-3298.
M. Nomura, et al. "Synthesis and Properties of Poly[di(1-naphthyl)-4-tolylamine] as a Hole Transport Material", Macromolecules, 37, (2004), pp. 1204-1210.
Office Action issued on Jun. 5, 2012 from the Japanese Patent Office in Japanese Application No. 2007-544447.

* cited by examiner

*Primary Examiner* — Anthony Ho
(74) *Attorney, Agent, or Firm* — Sughrue Mion, PLLC

(57) ABSTRACT

A conjugated or partially conjugated polymer including a structural unit of Formula I in the backbone: (Formula I), wherein Arl, $Ar_e$ are each independently a substituted or unsubstituted arylene or hetero arylene group with two or more aromatic rings fused together and Ar3 is an aryl or heteroaryl group of C4 to C40 or substituted aryl or heteroaryl group of C4 to C40 and devices containing such polymer. In addition, a composition of: (Formula V), wherein $Ar_1$, $Ar_e$ are arylene or heteroaryl groups and Ar3 is an aryl or heteroaryl group and wherein X is a leaving group such as halogen, boronic acid or boronate ester.

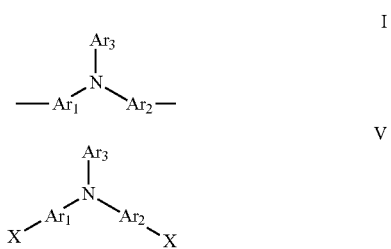

12 Claims, No Drawings

TRIARYLAMINE CONTAINING POLYMERS AND ELECTRONIC DEVICES

This application claims the benefit of the provisional application, U.S. Application No. 60/633,356, filed Dec. 3, 2004, which is incorporated herein by reference.

This invention relates to polymeric compositions comprising triarylamines and electronic devices comprising such compositions.

BACKGROUND

Conjugated polymers are known to have optoelectronic properties. Several reports have demonstrated blue light emission from fluorene homopolymers, e.g., A. W. Grice; D. D. C. Bradley, M. T. Bernius; M. Inbasekaran, W. Wu, E. P. Woo; *Appl. Prep. Lett.* 1998, 73, Y. Young and Q. Pei; J. Appl. Prep. 81, 3294 (1997). WO 01/81294 A1 teaches a fluorene polymer that is end-capped with a charge transporting tricyclic arylamine. U.S. Pat. No. 5,874,179 (Kreuder et al) teaches optoelectronic polymers based on polyphenylenevinylene with nitrogen containing comonomers. Additionally, Kreuder further teaches that fluorene could be part of a fused nitrogen containing ring structure in a polyphenylenevinylene based polymer.

WO 2004/024670 describes a process for producing a high purity triarylamine and diarylamine at low cost by reacting an aromatic halogen compound with an aromatic amine in the presence of organic salt, a copper catalyst and a base. The aryl groups can be naphthalene group. JP 20022175883 describes an organic electroluminescent device comprising the triaryl amine compound emitting blue violet light. A synthesis of tri-(4-bromonaphthyl)amine was described in detail and this compound is reported to emit violet-blue light in an organic electroluminescent device. Momura et al. (Macromolecules, 37(4) 2004 1204-1210) describe the synthesis of di(1-naphthyl)-4-tolylamine homopolymer and its application as a hole transporting layer in organic light-emitting devices. JP 1999184109 describes the composition of an electrophotographic photoreceptor that possesses a triarylamine derivative based charge transport layer and the electrophotographic apparatus using this photoreceptor. The triarylamine used as a charge transport layer has one substituted aryl group, Ar, and two fluorenyl groups attached to the nitrogen atom.

A need remains for optoelectronic materials and devices that exhibit good conductivity with improved efficiency, which emit a deep blue light with high brightness and at relatively low operating voltages.

SUMMARY OF THE INVENTION

The present inventors have discovered that the inclusion of a triarylamine moiety of a particular type in the main chain of a conjugated or partially conjugated polymer provides remarkably improved conductivity at low voltages as well as higher device efficiency compared to prior art technology and which is capable of deep blue light emission.

More specifically, the instant invention is a conjugated or partially conjugated polymer comprising a structural unit of Formula I on the backbone:

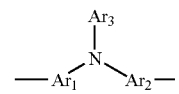

I wherein $Ar_1$ and $Ar_2$ are each independently a substituted or unsubstituted arylene or hetero-arylene group with two or more aromatic rings fused together and $Ar_3$ is an aryl or heteroaryl group of $C_4$ to $C_{40}$ or substituted aryl or heteroaryl group of $C_4$ to $C_{40}$.

In another aspect, the invention is a film comprising Formula I. In another aspect, the invention is a blend of the polymer comprising Formula I with at least one additional conjugated polymer. In yet another aspect, the invention is an electroluminescent device comprising a film comprising a polymer comprising Formula I. In another aspect, the invention is a photocell comprising a first electrode, a film comprising the polymer comprising Formula I and a second electrode.

In a yet further aspect, the invention is a field effect transistor comprising: (a) an insulator layer, the insulator layer being an electrical insulator, the insulator layer having a first side and a second side; (b) a gate, the gate being an electrical conductor, the gate being positioned adjacent the first side of the insulator layer; (c) a semiconductor layer, the semiconductor layer comprising the polymer comprising Formula I and a second electrode; (d) a source, the source being an electrical conductor, the source being in electrical contact with the first end of the semiconductor layer; and (e) a drain, the drain being an electrical conductor, the drain being in electrical contact with the second end of the semiconductor layer.

In another aspect, the invention is a composition of Formula V

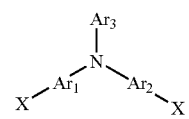

V wherein $Ar_1$ and $Ar_2$ are arylene or heteroarylene groups and $Ar_3$ is an aryl or heteroaryl group and wherein X is a leaving group such as halogen, boronic acid or boronate ester.

DETAILED DESCRIPTION OF THE INVENTION

In one embodiment, the invention is a polymer comprising a conjugated or partially conjugated polymer with a structural unit of Formula I:

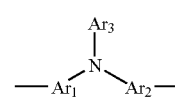

I wherein $Ar_1$ and $Ar_2$ are each independently a substituted or unsubstituted arylene or hetero-arylene group with two or more aromatic rings fused together and $Ar_3$ is an aryl or heteroaryl group of $C_4$ to $C_{40}$ or substituted aryl or heteroaryl group of $C_4$ to $C_{40}$.

Ar₁ and Ar₂ are preferably substituted or unsubstituted naphthalenediyl, anthracenediyl or fluorenediyl. If Ar₁ and Ar₂ comprise a fluorenediyl, such fluorenediyl can have the Formula II

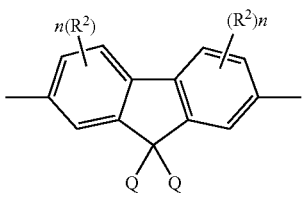

II where Q is $R^1$ or Ar, wherein Ar is a arylene or heteroarylene group of $C_4$ to $C_{40}$ or substituted arylene or heteroarylene group of $C_4$ to $C_{40}$; $R^1$ is independently, in each occurrence H, $C_{1-40}$ hydrocarbyl or $C_{3-40}$ hydrocarbyl containing one or more S, N, O, P or Si atoms, or both of $R^1$ together with the 9-carbon on the fluorene may form a $C_{5-20}$ ring structure that may contain one or more S, N, O, P or Si atoms; $R^2$ is independently in each occurrence a $C_1$-$C_{40}$ hydrocarbon, $C_3$-$C_{40}$ hydrocarbyl containing one or more heteroatoms of S, N, O, P or Si, which are incorporated into the carbon-carbon bond, or a substituted or unsubstituted aryl group or heteroaryl group; n is independently in each occurrence, 0-3.

Ar₃ is a substituted or unsubstituted aryl or heteroaryl group. Ar₃ is preferably an aryl or heteroaryl group having Formula III

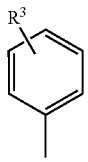

III where $R^3$ is a $C_{1-40}$ hydrocarbon, $C_{3-40}$ hydrocarbyl containing one or more heteroatoms of S, N, O, P or Si, or a substituted or unsubstituted aryl group or heteroaryl group.

In another embodiment, the invention is a polymer comprising a conjugated or partially conjugated polymer with a structural unit of Formula IV:

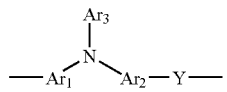

IV wherein Ar₁ and Ar₂ are each independently a substituted or unsubstituted arylene or hetero arylene group with two or more aromatic rings fused together; Ar₃ is an aryl or heteroaryl group of $C_4$ to $C_{40}$ or substituted aryl or heteroaryl group of $C_4$ to $C_{40}$; and Y is a residual unit of a monomer of a conjugated polymer which polymer may optionally additionally include monomers of a non-conjugated polymer. Ar₁ and Ar₂ are preferably substituted or unsubstituted naphthalenediyl, anthracenediyl or fluorenediyl.

The Y moiety of Formula IV is preferably independently in each occurrence selected from the group of conjugated units of the formulas or a combination of the formulas:

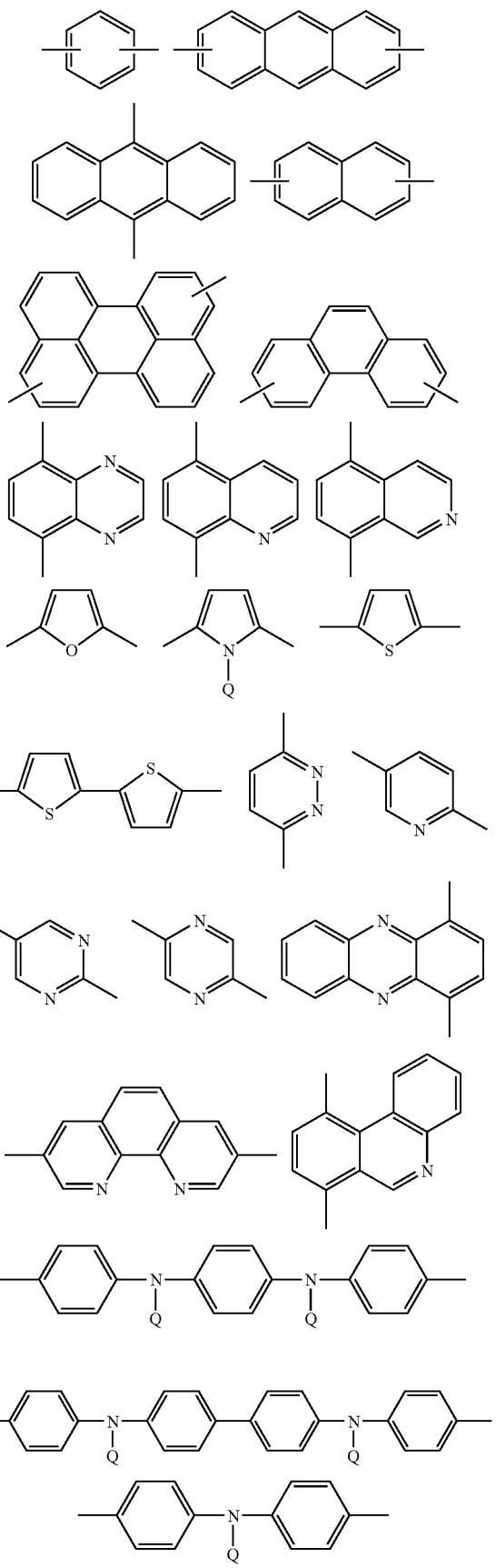

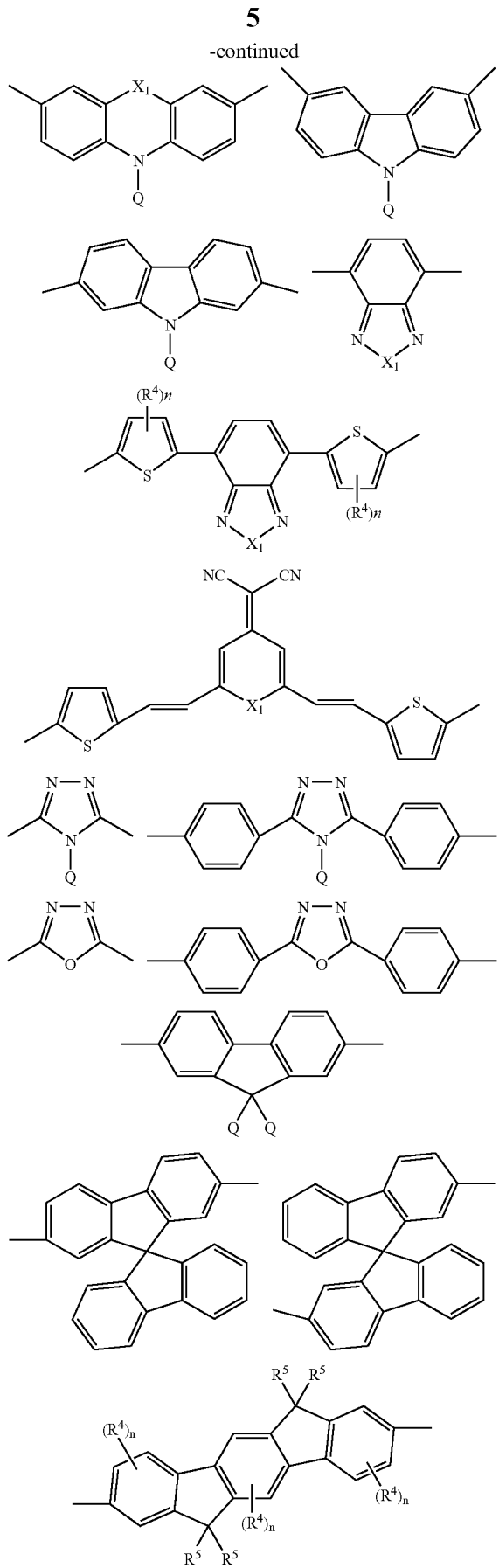
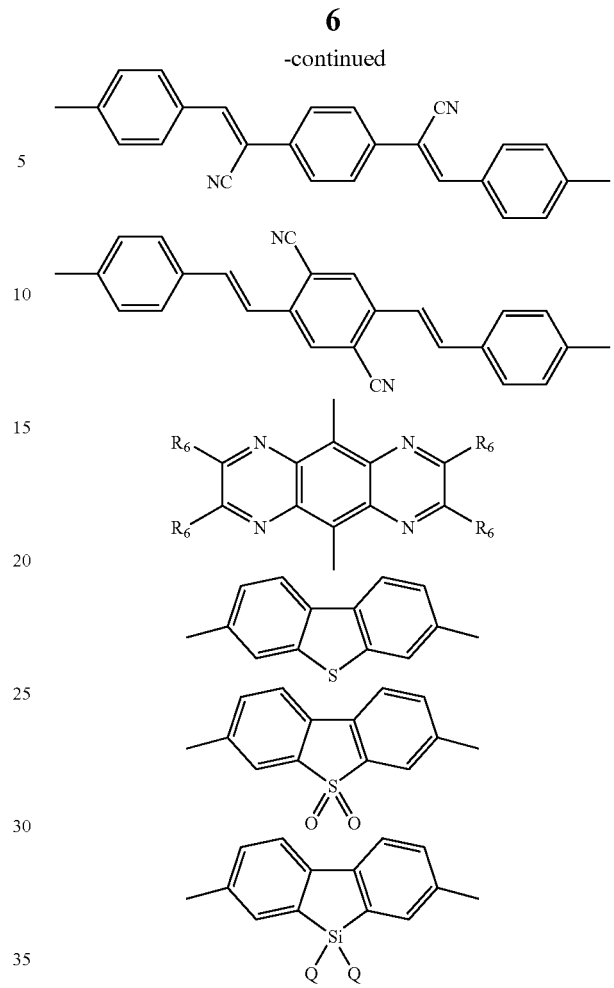

wherein the conjugated units may bear one or more substitutents, such substituents being independently in each occurrence $C_{1-20}$ hydrocarbyl, $C_{1-20}$ hydrocarboxyloxy, $C_{1-20}$ thioether, $C_{1-20}$ hydrocarbyloxycarbonyl, $C_{1-20}$ hydrocarboxy carbonyloxy, cyano, or fluoro group;

$X_1$ is O or S;

Q is $R^1$ or Ar;

$R^6$ is independently, in each occurrence H, $C_{1-40}$ hydrocarbyl or $C_{3-40}$ hydrocarbyl containing one or more S, N, O, P or Si atoms;

n is independently in each occurrence, 0-3;

Ar is an aryl or heteroaryl group of $C_4$ to $C_{40}$ or substituted aryl or heteroaryl group of $C_4$ to $C_{40}$; $R^1$ is independently, in each occurrence H, $C_{1-40}$ hydrocarbyl or $C_{3-40}$ hydrocarbyl containing one or more S, N, O, P or Si atoms, or both of $R^1$ together with the 9-carbon on the fluorene may form a $C_{5-20}$ ring structure that may contain one or more S, N, Si, P or O atoms; $R^5$ is independently, in each occurrence H, $C_{1-40}$ hydrocarbyl or $C_{3-40}$ hydrocarbyl containing one or more S, N, O, P or Si atoms, or both of $R^5$ together with the 9-carbon on the fluorene may form a $C_{5-20}$ ring structure that may contain one or more S, N, Si, P or O atoms; and $R^4$ is independently in each occurrence $C_{1-20}$ hydrocarbyl, $C_{1-20}$ hydrocarbyloxy, $C_{1-20}$ thioether, $C_{1-20}$ hydrocarbyloxycarbonyl, $C_{1-20}$ hydrocarbylcarbonyloxy, or cyano or fluoro group.

The optionally additional monomers of a non-conjugated polymer preferably comprise a polycarbonate monomer, a polystyrene monomer, a polyester monomer, a polyacrylate monomer or a mixture thereof. The instant invention includes the polymer comprising Formula I dissolved or dispersed in a solvent. The instant invention includes a film the polymer comprising Formula I. The instant invention includes a blend of the polymer comprising Formula I with at least one additional conjugated polymer.

In another embodiment, the invention is an electroluminescent device comprising at least one organic film comprising the polymer comprising Formula I, arranged between an anode material and a cathode material such that under an applied voltage, the organic film emits blue light which is transmitted through a transparent exterior portion of the device.

In another embodiment, the invention is a field effect transistor comprising: (a) an insulator layer, the insulator layer being an electrical insulator, the insulator layer having a first side and a second side; (b) a gate, the gate being an electrical conductor, the gate being positioned adjacent the first side of the insulator layer; (c) a semiconductor layer, the semiconductor layer comprising the polymer comprising Formula I and a second electrode; (d) a source, the source being an electrical conductor, the source being in electrical contact with the first end of the semiconductor layer; and (e) a drain, the drain being an electrical conductor, the drain being in electrical contact with the second end of the semiconductor layer. The instant invention also includes a photocell comprising a first electrode, a film comprising the polymer comprising Formula I and a second electrode.

The instant invention is also a composition of Formula V

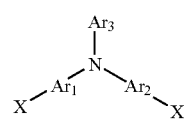

wherein $Ar_1$ and $Ar_2$ are each independently substituted or unsubstituted arylene or hetero arylene group with two or more aromatic rings fused together and $Ar_3$ is an aryl or heteroaryl group of $C_4$ to $C_{40}$ or substituted aryl or heteroaryl group of $C_4$ to $C_{40}$.

$Ar_1$ and $Ar_2$ are preferably substituted or unsubstituted naphthalenediyl, anthracenediyl or fluorenediyl. If $Ar_1$ and $Ar_2$ comprise a fluorenediyl, such fluorenediyl can have the Formula II

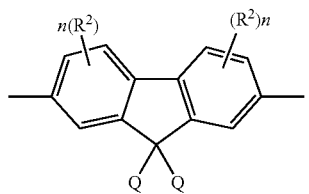

where Q is $R^1$ or Ar, wherein Ar is a aryl or heteroaryl group of $C_4$ to $C_{40}$ or substituted aryl or heteroaryl group of $C_4$ to $C_{40}$; $R^1$ is independently, in each occurrence H, $C_{1-40}$ hydrocarbyl or $C_{3-40}$ hydrocarbyl containing one or more S, N, O, P or Si atoms, or both of $R^1$ together with the 9-carbon on the fluorene may form a $C_{5-20}$ ring structure that may contain one or more S, N, O, P or Si atoms; $R^2$ is independently in each occurrence a $C_1$-$C_{40}$ hydrocarbon, $C_3$-$C_{40}$ hydrocarbyl containing one or more heteroatoms of S, N, O, P or Si, or a substituted or unsubstituted aryl group or heteroaryl group; n is independently in each occurrence, 0-3.

$Ar_3$ is a substituted or unsubstituted aryl or heteroaryl group. $Ar_3$ is preferably an aryl or heteroaryl group having Formula III

where $R^3$ is a $C_{1-40}$ hydrocarbon, $C_{3-40}$ hydrocarbyl containing one or more heteroatoms of S, N, O, P or Si, or a substituted or unsubstituted aryl group or heteroaryl group.

In another embodiment, additional conjugated Y units include hole transporting moieties, electron transporting moieties, and/or light emitting moieties. The additional units are used to optimize one or more of the following: charge injection, charge transport, electroluminescent device efficiency and lifetime. In this embodiment, the conjugated unit Y is selected from the group of conjugated units of the formulas or a combination of the formulas:

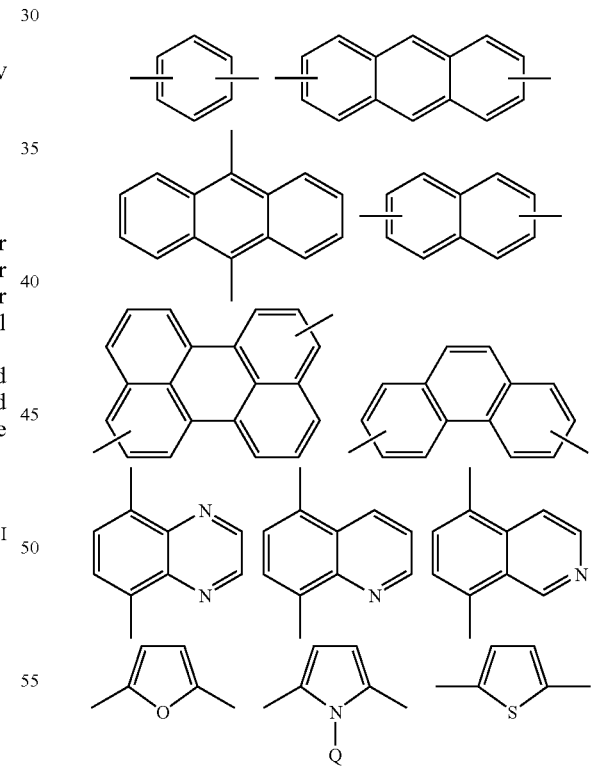

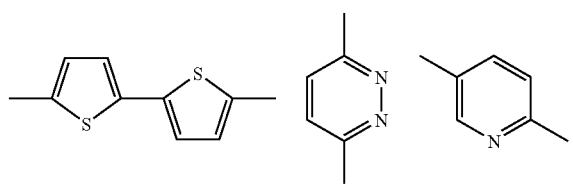

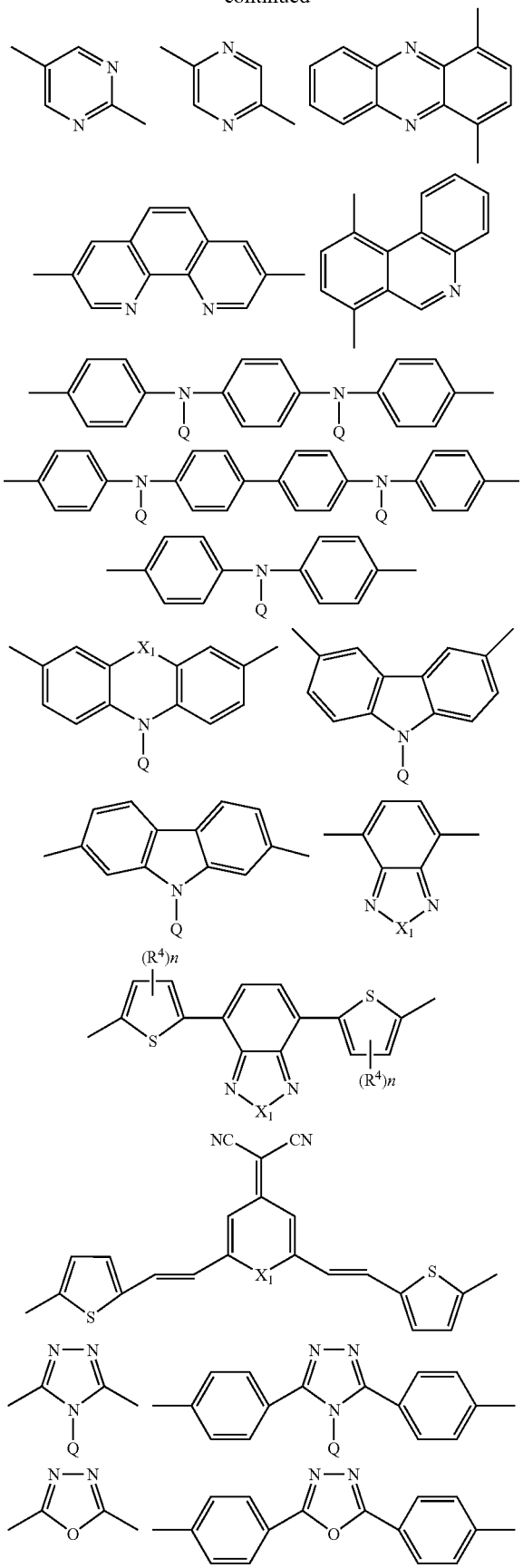
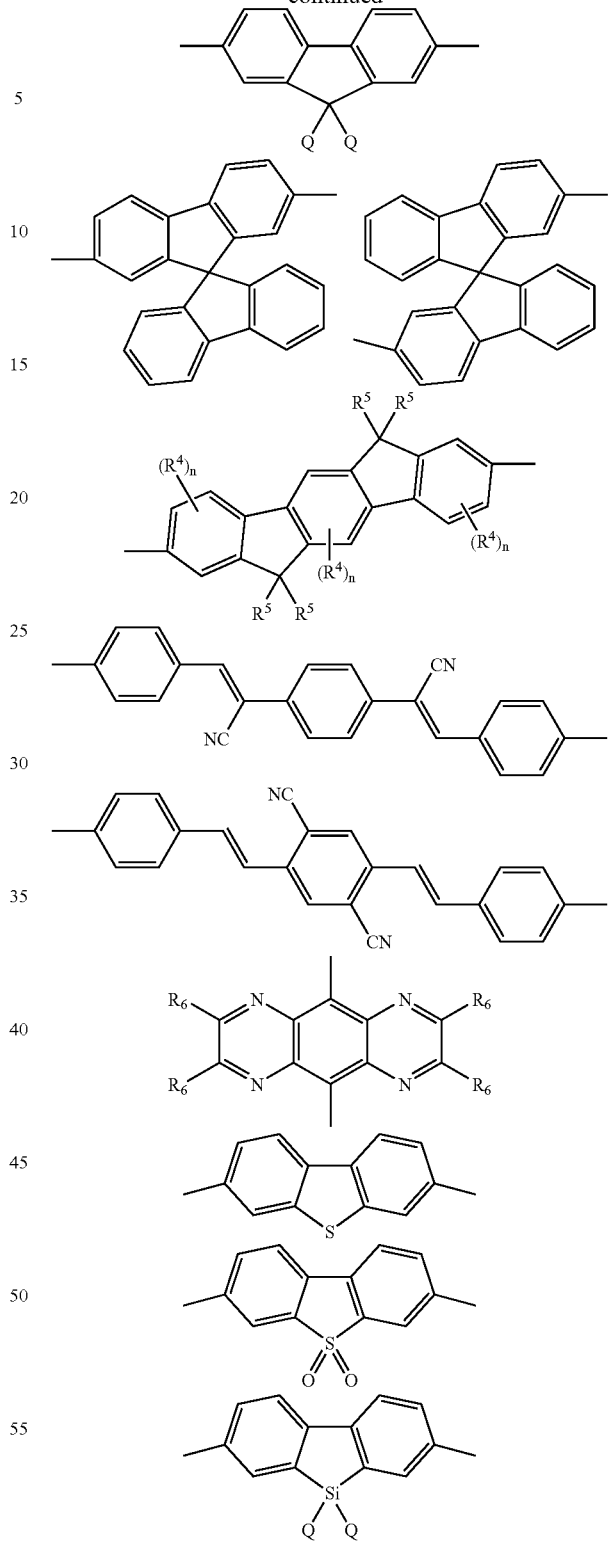
wherein the conjugated units may bear one or more substitutents, such substituents being independently in each occurrence $C_{1-20}$ hydrocarbyl, $C_{1-20}$ hydrocarboxyloxy, $C_{1-20}$ thioether, $C_{1-20}$ hydrocarbyloxycarbonyl, $C_{1-20}$ hydrocarboxycarbonyloxy, cyano, or fluoro group;
$X_1$ is O or S;
Q is $R^1$ or Ar;

$R^6$ is independently, in each occurrence H, $C_{1-40}$ hydrocarbyl or $C_{3-40}$ hydrocarbyl containing one or more S, N, O, P or Si atoms;

n is independently in each occurrence 0-3;

Ar is an aryl or heteroaryl group of $C_4$ to $C_{40}$ or substituted aryl or heteroaryl group of $C_4$ to $C_{40}$; $R^1$ is independently, in each occurrence H, $C_{1-40}$ hydrocarbyl or $C_{3-40}$ hydrocarbyl containing one or more S, N, O, P or Si atoms, or both of $R^1$ together with the 9-carbon on the fluorene may form a $C_{5-20}$ ring structure that may contain one or more S, N, Si, P or O atoms; $R^5$ is independently, in each occurrence H, $C_{1-40}$ hydrocarbyl or $C_{3-40}$ hydrocarbyl containing one or more S, N, O, P or Si atoms, or both of $R^5$ together with the 9-carbon on the fluorene may form a $C_{5-20}$ ring structure that may contain one or more S, N, Si, P or O atoms; and $R^4$ is independently in each occurrence $C_{1-20}$ hydrocarbyl, $C_{1-20}$ hydrocarbyloxy, $C_{1-20}$ thioether, $C_{1-20}$ hydrocarbyloxycarbonyl, $C_{1-20}$ hydrocarbylcarbonyloxy, cyano or fluoro group.

The polymers of the invention have a weight average molecular weight of about 10,000 Daltons or greater, 20,000 Daltons or greater, and preferably 50,000 Daltons or greater; 1,000,000 Daltons or less, 500,000 Daltons or less, and preferably 400,000 Daltons or less. Molecular weights are determined using gel permeation chromotography using polystyrene as an internal standard.

The polymers demonstrate a polydispersity (Mw/Mn) of 10 or less, 5 or less, 4 or less and preferably 3 or less.

The polymers of this invention may be assembled by any known coupling reaction for making aromatic compounds. Preferably, the Suzuki coupling reaction is used. The Suzuki reaction couples aromatic compounds using a diboronated aromatic moiety and a dihalogenated aromatic moiety. The reaction allows for the creation of long chain, high molecular weight polymers. Additionally, by controlling the sequence of addition, either random or block copolymers may be produced.

Preferably, the Suzuki reaction starts with a diboronated monomer. The Suzuki process is taught in U.S. Pat. No. 5,777,070, which is expressly incorporated herein by reference.

Toluene or xylenes are the preferred solvents for the Suzuki reaction to prepare the polymers of the instant invention. Sodium carbonate in water is the preferred base, a palladium complex catalyst, such as tetrakis(triphenylphosphine)palladium or dichlorobis(triphenylphosphine)palladium(II) is the preferred catalyst, and a phase transfer catalyst, preferably, a quaternary ammonium salt is used to speed up the reaction for achieving high molecular weight in a short period of time. Monoaryl amines, unsubstituted on the nitrogen atom, are commercially available from many commercial vendors including Aldrich Chemical Company. Triaryl substituted amines are produced through the reaction of a N-unsubstituted precursor with a brominated or iodinated aryl or substituted aryl compound. The ratio of monoarylamine to bromoaryl or iodoaryl or substituted bromo or iodo aryl is 1 to 2.2-4. The materials are reacted in the presence of a catalyst. Preferably, the catalyst is tris(dibenzylideneacetone)dipalladium and tri-t-butylphosphine. Preferably, sodium tert-butoxide may be used as the base. The materials are heated and refluxed for about 15 hours at 80-110° C. in toluene. The solution is cooled. Triaryl amine is isolated and further brominated with bromination techniques known to those skilled in the art. The most preferred brominating agent is N-bromosuccinimide in a solvent such as DMF or methylene chloride.

Another aspect of this invention is related to polymer blends. The blends comprise a polymer containing structural units of Formula I or Formula I blended with at least one other conjugated polymer. As used herein, the term "conjugated polymer" means a polymer with a backbone of overlapping π orbitals. Conjugated polymers that may be used in the blends include polyflourenes, poly(arylenevinylene), polyphenylenes, polyindenofluorenes and polythiophenes, including homopolymers, co-polymers or substituted homopolymers and/or copolymers of any of these conjugated polymers.

Preferably, the polymer blend is composed of at least 1 weight percent of a polymer containing units of Formula I. The most preferred polymer blends have high photoluminescent and electroluminescent efficiency. Other additives such as viscosity modifiers, antioxidants and coating improvers may optionally be added. Additionally, blends of two or more low polydispersity polymers of similar compositions but different molecular weight can also be formulated.

Another aspect of this invention is the films formed from the polymers of the invention. Such films can be used in polymeric light emitting diodes, photovoltaic cells and field effect transistors. Preferably, such films are used as emitting layers or charge carrier transport layers. The films may also be used as protective coatings for electronic devices and as fluorescent coatings. The thickness of the film or coating is dependent upon the use.

Generally, such thickness can be from 0.005 to 200 microns. When the coating is used as a fluorescent coating, the coating or film thickness is from 50 to 200 microns. When the coatings are used as electronic protective layers, the thickness of the coating can be from 5 to 20 microns. When the coatings are used in a polymeric light-emitting diode, the thickness of the layer formed is 0.005 to 0.2 microns. The polymers of the invention form good pinhole-free and defect-free films.

The films are readily formed by coating the polymer composition from another embodiment of this invention in which the composition comprises the polymer and at least one organic solvent. Preferred solvents are aliphatic hydrocarbons, chlorinated hydrocarbons, aromatic hydrocarbons, ketones, ethers and mixtures thereof. Additional solvents which can be used include 1,2,4-trimethylbenzene, 1,2,3,4-tetramethyl benzene, pentylbenzene, mesitylene, cumene, cymene, cyclohexylbenzene, diethylbenzene, tetralin, decalin, 2,6-lutidine, 2-fluoro-m-xylene, 3-fluoro-o-xylene, 2-chlorobenzotrifluoride, dimethylformamide, 2-chloro-6-fluorotoluene, 2-fluoroanisole, anisole, 2,3-dimethylpyrazine, 4-fluoroanisole, 3-fluoroanisole, 3-trifluoro-methylanisole, 2-methylanisole, phenetole, 4-methylansiole, 3-methylanisole, 4-fluoro-3-methylanisole, 2-fluorobenzonitrile, 4-fluoroveratrol, 2,6-dimethylanisole, 3-fluorobenzonitrile, 2,5-dimethylanisole, 2,4-dimethylanisole, benzonitrile, 3,5-dimethylanisole, N,N-dimethylaniline, ethyl benzoate, 1-fluoro-3,5-dimethoxybenzene, 1-methylnaphthalene, N-methylpyrrolidinone, 3-fluorobenzotrifluoride, benzotrifluoride, benzotrifluoride, dioxane, trifluoromethoxybenzene, 4-fluorobenzotrifluoride, 3-fluoropyridine, toluene, 2-fluorotoluene, 2-fluorobenzotrifluoride, 3-fluorotoluene, 4-isopropylbiphenyl, phenyl ether, pyridine, 4-fluorotoluene, 2,5-difluorotoluene, 1-chloro-2,4-difluorobenzene, 2-fluoropyridine, 3-chlorofluorobenzene, 3-chlorofluorobenzene, 1-chloro-2,5-difluorobenzene, 4-chlorofluorobenzene, chlorobenzene, o-dichlorobenzene, 2-chlorofluorobenzene, p-xylene, m-xylene, o-xylene or mixture of o-, m-, and p-isomers. It is preferable that such solvents have relatively low polarity. High boilers and solvent mixtures are better for ink jetting, but xylenes and toluene are best for spin coating. Preferably, the solution contains from about 0.1 to 5 percent of a polymer comprising a structural unit of Formula I. Films can be prepared by means well known in the art including spin-coating, spray-coating, dip-coating, roll-coating, offset printing, ink jet printing, screen printing, stamp-coating or doctor blading.

In another embodiment, the invention is a composition comprising a polymer or polymer blend of the invention in a solvent. Solvents which can be used include toluene, xylene, a mixture of o, m and p-isomers of xylene, mesitylene, diethylbenzene, ethylbenzene or benzene derivatives of higher substituted level. Preferably, the solution contains from 0.1 to 10 weight percent of the composition. For thin coatings, it is preferred that the composition contains from 0.5 to 5.0 percent by weight of the composition. The composition is applied to the appropriate substrate by the desired method and the solvent is allowed to evaporate. Residual solvent may be removed by vacuum, heat and/or by sweeping with an inert gas such as nitrogen.

The polymers of this invention demonstrate strong electroluminesence in addition to photoluminesence. Thus, another aspect of the invention relates to organic electroluminescent (EL) devices having a film comprising the polymers of this invention. Preferably, the EL devices of this invention emit light when subjected to an applied voltage of 20 volts or less, 10 volts or less and preferably 6 volts or less.

An organic EL device typically consists of an organic film sandwiched between an anode and a cathode. When a positive bias is applied to the device, holes are injected into the organic film from the anode, and electrons are injected into the organic film from the cathode. The combination of a hole and an electron may give rise to an exciton that may undergo radiative decay to the ground state by liberating a photon.

In practice, the anode is commonly a mixed oxide of tin and indium for its conductivity and transparency. The mixed oxide (ITO) is deposited on a transparent substrate such as glass or plastic so that the light emitted by the organic film may be observed. The organic film may be the composite of several individual layers each designed for a distinct function. Because holes are injected from the anode, the layer next to the anode should have the functionality of transporting holes. Similarly, the layer next to the cathode should have the functionality of transporting electrons. In many instances, the electron or hole transporting layer may also act as the emitting layer. In some instances, a single layer may perform the combined functions of hole and electron transport and light emission.

The metallic cathode may be deposited either by thermal evaporation or by sputtering. The thickness of the cathode may be from 1 nm to 1000 nm. The preferred metals are calcium, magnesium, indium, aluminum and barium. A thin layer (1-10 nm) of an alkali or alkaline metal halide, e.g., LiF, NaF, CsF or RbF, may be used as a buffering layer between the light emitting polymer and the cathode, calcium, barium, or magnesium. Alloys of these metals may also be used. Alloys of aluminum containing 1 to 5 percent of lithium and alloys of magnesium containing at least 80 percent of magnesium are preferred.

In another embodiment, the electroluminescent device comprises at least one hole injecting polymer film (PEDOT film, for example) and a light-emitting polymer film comprised of the composition of the invention, arranged between an anode material and a cathode material such that under an applied voltage, holes are injected from the anode material into the light emitting polymer via the hole-injecting polymer film and electrons are injected from the cathode material into the light-emitting polymer film when the device is forward biased, resulting in light emission from the light-emitting layer. In another embodiment, layers of hole-transporting polymers are arranged so that the layer closest to the anode has the lowest oxidation potential, with the adjacent layers having progressively higher oxidation potentials. By these methods, electroluminescent devices having relatively high light output per unit voltage may be prepared.

Another embodiment of the invention relates to photocells comprising one or more of the polymers of the invention wherein the polymers are present as single-layer films or as multiple-layer films, whose combined thickness is in the range of 10 nm to 1000 nm, in the range of 25 nm to 500 nm, or preferably in the range of 50 nm to 300 nm. When two or more polymers are used, they may be deposited separately as distinct layers or deposited as one layer from a solution containing a blend of the desired polymers.

"Photocells" mean a class of optoelectronic devices that can convert incident light energy into electrical energy. Examples of photocells are photovoltaic devices, solar cells, photodiodes, and photodetectors. A photocell generally comprises a transparent or semi-transparent first electrode deposited on a transparent substrate. A polymer film is then formed onto the first electrode that is, in turn, coated by a second electrode. Incident light transmitted through the substrate and the first electrode is converted by the polymer film into excitons that can dissociate into electrons and holes under the appropriate circumstances, thus, generating an electric current.

Another embodiment of the invention relates to metal-insulator-semiconductor field effect transistors comprising one or more of the polymers of the invention which serve as a semiconducting polymer. A field effect transistor comprises five elements. The first element is an insulator layer. The insulator layer is an electrical insulator, having a first side and a second side. The second element is a gate. The gate is an electrical conductor. The gate is positioned adjacent the first side of the insulator layer.

The third element is a semiconductor layer. The semiconductor layer comprises a polymer comprising a structural unit of Formula I above. The semiconductor layer has a first side, a second side, a first end and a second end, the second side of the semiconductor layer being adjacent to the second side of the insulator layer. The polymer is deposited onto an insulator wherein the polymers are present as single-layer films or as multiple-layer films whose combined thickness is in the range of 10 nm to 1000 nm, in the range of 25 nm to 500 nm, or preferably in the range of 50 nm to 300 nm.

The fourth element of a field effect transistor is a source. The source is an electrical conductor. The source is in electrical contact with the first end of the semiconductor layer. The fifth element is a drain. The drain is an electrical conductor. The drain is in electrical contact with the second end of the semiconductor layer. A negative voltage bias applied to the gate causes the formation of a hole conduction channel in the semiconductor layer connecting the source to the drain. A positive bias applied to the gate causes the formation of an electron-conducting channel in the semiconductor layer.

As with electroluminiscent devices, the polymer films comprising the semiconductor layer may be formed by solvent-based processing techniques such as spin-coating, roller-coating, dip-coating, spray-coating and doctor-blading and ink jet printing. When two or more polymers are used, they may be deposited separately as distinct layers or deposited as one layer from a solution containing a blend of the desired polymers.

Two electrodes (source and drain) are attached to the semiconducting polymer and a third electrode (gate) onto the opposite surface of the insulator. If the semiconducting polymer is hole transporting (i.e, the majority carriers are positive holes), then applying a negative DC voltage to the gate electrode induces an accumulation of holes near the polymer-insulator interface, creating a conduction channel through which electric current can flow between the source and the drain. The transistor is in the "on" state. Reversing the gate voltage causes a depletion of holes in the accumulation zone and cessation of current. The transistor is in the "off" state.

EXAMPLES

The following examples are included for illustrative purpose and do not limit the scope of the claims.

Synthesis of 1,1'-dinaphthyl(4-butyl)phenyl amine (DNA) monomer precursor

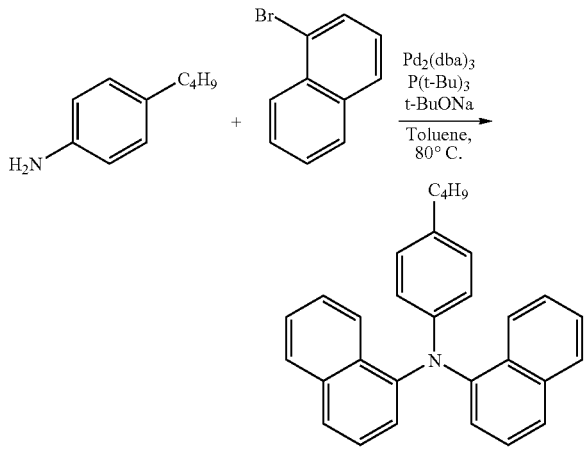

1-bromonaphthalene: 22.78 g (110 mmol)
4-n-butylaniline: 7.46 g, 50 mmol
$Pd_2(dba)_3$; 1.007 g, 1.1 mmol
P(t-Bu)3: 0.89 g (8.9 g in 10% hexane solution), 4.4 mmol
tBuONa: 14.8 g, 154 mmol To a three-necked flask equipped with a reflux condenser, 1-bromonaphthalene, 4-butylaniline, $Pd_2(dba)_3$, $P(t-Bu)_3$, t-BuONa and toluene (150 ml) are added and stirred at 80 deg C until the 4-butylaniline disappears as shown by HPLC analysis. After the reaction is completed, the reaction mixture is passed through a column packed with 6 inchs of neutral alumina, and 2 L of toluene eluent is collected. The solvent is removed on rotary evaporator. The residue is extracted with 250 ml of diethyl ether, and the organic layer is washed with 3×200 ml of brine. The organic layer is dried over $MgSO_4$ and concentrated on a rotary evaporator. The crude product is recrystallized from toluene/ethanol (1:1 in volume) mixture. The final product is an off-white powder with a purity of 99% by HPLC; the yield is 56%.

Synthesis of 4-bromo-N-(4-bromo-1-naphthalenyl)-N-(4-butylphenyl)-1-napthalenamnine monomer

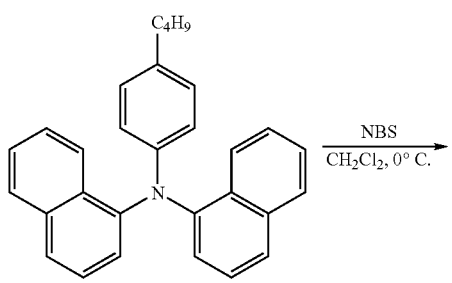

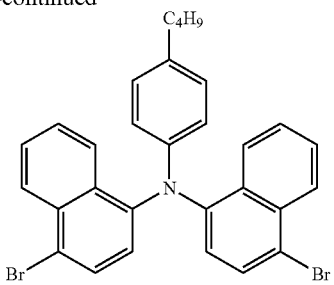

To 1 g (2.49 mmol) of DNA dissolved in 40 ml of methylene chloride is added 0.89 g (5.0 mmol) of N-bromosuccinimide (NBS) dissolved in ~15 ml of DNT (plus 5 ml for wash) at 0° C. (cooled in ice bath). With the addition of the NBS solution, the reaction mixture changes from colorless to brown. After the addition of NBS, the reaction mixture is stirred at this temperature for 2 h. The reaction mixture is transferred to a 500 ml separatory funnel and washed with 3×300 ml of distilled water. All of the water layers are combined and washed with 250 ml of $CH_2Cl_2$. The combined organic layer is dried over MgSO4. The solvent is removed on a rotary evaporator and a dark brown oil is obtained. This crude product is, recrystallized from 200 ml of isopropyl alcohol and 1 g of an off-white powdery product is obtained. The yield is 71.4%. The purity as deternined by HPLC is 99.0%.

Synthesis of 1,1'-dinaphthyl(4-butoxy)phenyl amine (DNOA) monomer precursor

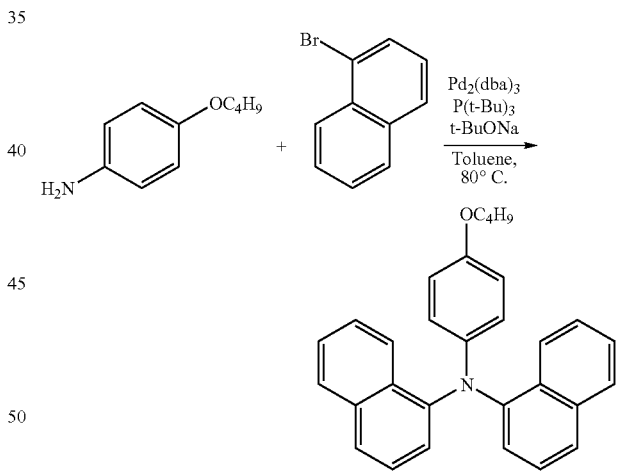

1-bromonaphthalene: 22.78 g (110 mmol)
4-n-butoxyaniline: 8.26 g, 50 mmol
$Pd_2(dba)_3$; 1.007 g, 1.1 mmol
P(t-Bu)3: 0.89 g (8.9 g in 10% hexane solution), 4.4 mmol
tBuONa: 14.8 g, 154 mmol To a three-necked flask equipped with a reflux condenser, 1-bromonaphthalene, 4-butoxyaniline, $Pd_2(dba)_3$, $P(t-Bu)_3$, t-BuONa and toluene (150 ml) are added and stirred at 80° C. until the 4-butoxyaniline disappears as shown by HPLC analysis. After the reaction is completed, the reaction mixture is passed through a column packed with 6 inches of neutral alumina, and 2 L of toluene eluent is collected. The solvent is removed on rotary evaporator. The residue is extracted with 250 ml of diethyl ether, and the organic layer is washed with 3×200 ml of brine. The organic layer is dried over $MgSO_4$ and concentrated on a rotary evaporator. The crude product is recrystallized from isopropanol. The final product is an off-white powder with a purity of 98.5% as determined by BPLC; the yield is 54%.

Synthesis of 4-bromo-N-(4-bromo-1-naphthalenyl)-N-(4-butoxyphenyl)-1-napthalenamnine monomer

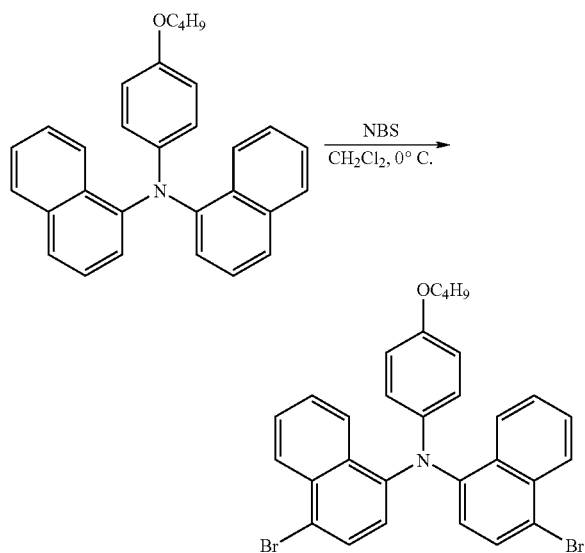

To 3.6 g (8.62 mmol) of DNOA dissolved in 100 ml of methylene chloride is added 3.05 g (17.15 mmol) of N-bromosuccinimide (NBS) dissolved in ~20 ml of DMF (plus 5 ml for washing) at 0° C. (cooled in ice bath). With the addition of the NBS solution, the reaction mixture changes from colorless to brown. After the addition of NBS, the reaction mixture is stirred at this temperature for 2.5 h. The reaction mixture is transferred to a 500 ml separatory funnel and washed with 3×300 ml of distilled water. All of the water layers are combined and washed with 250 ml of $CH_2Cl_2$. The combined organic layer is dried over MgSO4. The solvent is removed on a rotary evaporator and a dark brown oil is obtained. This crude product is recrystallized from 200 ml of isopropyl alcohol and 2.2 g of an off-white powdery product is obtained. The yield is 44%. The purity as determined by KPLC is 98.3%.

Polymer 1

Copolymerization of 4-bromo-N-(4-bromo-1-napthalenyl)-N-(4-butylphenyl)-1-napthalenamine with 2,7-bis(1,3,2-dioxaborolan-2-yl)-9,9-dioctylfluorene and 2,7-dibromo-9,9-bis(4-ethyloxyethyloxyphenyl)fluorene To a 250 mL three-necked round bottom flask equipped with a stirrer shaft, glass stopper and reflux condenser are added 2,7-bis(1,3,2-dioxaborolan-2-yl)-9,9-dioctylfluorene (2.5024 g, 4.7088 mmol), 2,7-dibromo-9,9-bis(4-ethoxyethoxyphenyl)fluorene (2.2843 g, 3.4967 mmol), 4,4'-dibromo-1,1'-dinaphthyl(4-butyl)phenyl amine (0.6447 g, 1.1655 mmol), phase transfer agent, Aliquot 336 (0.69 g), and 35 mL of toluene. The solids are allowed to dissolve in the toluene at 65° C. Then 10 ml of 2M $Na_2CO_3$ solution are added to the reaction solution. The reaction mixture is allowed to stirred under nitrogen for 5 minutes, then 3.1 mg of trans-dichloro-bis(triphenylphosphine)palladium (II) (3.2 mg, 0.0045 mmol) are added together with 5 ml toluene. Total volume of the mixture is 50 ml. The reaction flask is heated up to 105° C. The whole system is connected to a nitrogen line through the reflux condenser so that a dynamic blanket of nitrogen is maintained over the solution throughout the duration of the reaction. In one and one half hour, all solids are back into solution and the stirring rate is increased. In three hours, the polymer solution appears to be very viscous and is capped with 0.5 g of phenyl boronic acid and 15 ml of THF together with 90 ml of toluene. The reaction is continued for 16.5 hr. Then 5 g of DDC dissolved in 40 ml of water are added to the above reaction flask and the temperature is lowered to 84° C. The reaction is allowed to proceed for 4 hrs.

The reaction mixture is removed from the oil bath and the polymer solution is transferred to a 1 L separatory funnel. The water layer is separated from the polymer solution (16 mL). The polymer solution is then washed 4 times with 250 mL of 4% acetic acid solution. The polymer solution is further washed with 100 ml of 10% acetic acid solution twice and 3 times with 200 mL of water. A column of silica (3 inches) and alumina (3 inches) is prepared. 1 L of toluene is run through the column before running the polymer solution through the column. 1500 ml of toluene eluent is collected. The polymer solution is concentrated on a rotary evaporator to ~400 ml and precipitated into 2.5 L methanol. The polymer fibers are then dissolved in ~350 mL of CMOS toluene and precipitated a second time into 2.5 L of CMOS methanol. Polymer fibers are collected via filtration and allowed to dry overnight in a vacuum oven at 60° C. 2.1 g of polymer are collected. GPC analysis indicates an $M_p$ of 202,457 grams per mole, an $M_n$ of 158,324 grams per mole, an $M_{w=403,410}$ grams per mole and a polydispersity index (PDI) of 2.55.

Polymer 2

Monomers and reagents used for the polymerization are listed as follows: 2,7-bis(1,3,2-dioxaborolan-2-yl)-9,9-dioctylfluorene (2.4866 g, 4.6870 mmol), 2,7-dibromo-9,9-bis(4-ethoxyethoxyphenyl)fluorene (2.2766 g, 3.4804 mmol), 4-bromo-N-(4-bromo-1-naphthalenyl)-N-(4-butoxyphenyl)-1-napthalenamine (0.6736 g, 1.1601 mmol), phase transfer agent, aliquot 336 (0.7 g), trans-dichloro-bis(triphenylphosphine)palladium (II) (3.3 mg, 0.0045mmol), 10 ml of 2M $Na_2CO_3$ solution and 50 mL of toluene. The procedure is the same as used for Polymer 1. 2.5 g of Polymer 2 is obtained. GPC analysis: Mp=150,050, Mn=68,894; Mw=584,663, PDI=8.5.

Polymer 3:

Monomers and reagents used for the polymerization are listed as follows: 2,7-bis(1,3,2-dioxaborolan-2-yl)-9,9-dioctylfluorene (2.5003 g, 4.7072 mmol), 2,7-dibromo-9,9-bis(4-ethoxyethoxyphenyl)fluorene (2.2549 g, 3.4488 mmol), 4-bromo-N-(4-bromo-1-naphthalenyl)-N-(4-butylphenyl)-1-napthalenamine (0.6590 g, 1.1651 mmol), N,N'-bis(4-butylbenzene)-N,N'-bis(4-bromophenyl)-1,4-phenylenediamine (0.0323 g, 0.0466 mmol), phase transfer agent, aliquot 336 (0.7 g), trans-dichloro-bis(triphenylphosphine)palladium (II) (3.2mg, 0.0045mmol), 10 ml of 2M $Na_2CO_3$ solution and 50 ml of toluene. The procedure is the same as used for Polymer 1. 2.0 g of Polymer 3 is obtained. GPC analysis: Mp=276,259, Mn=176,537; Mw=379,016, PDI=2.1

Polymeric Light Emitting Diode (PLED) Using Polymer 1

Polymer 1 (60 mg) is dissolved in 6 mL of xylenes. The solution is heated to 70° C. and shaken for a minimum of 60 minutes before being filtered warm through a 0.22 microliter syringe filter. On a cleaned ITO (indium tin oxide) coated glass substrate, an 80 nm film of 1:16 polyethylenedioxythiopene:polystyrene sulfonic acid (PEDOT:PSS) is deposited and baked at 200° C. for 15 minutes in air on a hotplate. On the top of the PEDOT:PSS film, F8-TFB (copolymer of 9,9-dioctylfluorene and N-(4-butylphenyl)diphenylamine) interlayer solution is spin coated at 4500 RPM from 0.5 wt/vol %, baked at 180 degree in an oven for 20 minutes under N2, to give a thickness of 5-10 nm. On the top of F8TFB interlayer, an 80 nm film of polymer 1 is spin coated from a 1.0 wt/vol % xylenes solution and baked at 130° C. under nitrogen in an oven for one hour. The cathode metals (Ba (5nm)/Al (150 nm)) are then vacuum deposited over the polymer film. The device emits blue light (CIE Coordinates: x=0.16 y=0.22) under a dc voltage drive, and has a maximum brightness of 4235 cd/m$^2$ at 10 volts with an average light efficiency of 2.13 cd/A at 1000 cd/m$^2$.

PLED Using Polymer 2

The device fabrication is similar to that of the PLED made using Polymer 1. The device emits blue light (CIE Coordinates: x=0.15 y=0.21) under a dc voltage drive, and has a maximum brightness of 8357 cd/m$^2$ at 10 volts with an average light efficiency of 3.52 cd/A at 1000 cd/m2.

PLED Using Polymer 3

The device fabrication is similar to that of the PLED made using Polymer 1. The device emits blue light (CIE Coordinates: x=0.16 y=0.27) under a dc voltage drive, and has a maximum brightness of 15083 cd/m$^2$ at 10 volts with an average light efficiency of 6.67 cd/A at 1000 cd/m$^2$.

Conclusion

While this invention has been described as having preferred aspects, the instant invention can be further modified within the spirit and scope of this disclosure. This application is, therefore, intended to cover any variations, uses, or adaptations of the present invention using the general principles disclosed herein. Further, this application is intended to cover such departures from the present disclosure as come within the known or customary practice in the art to which this invention pertains and which fall within the limits of the appended claims.

What is claimed:

1. A composition comprising a conjugated or partially conjugated polymer with a structural unit of Formula I in the main chain of the polymer:

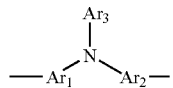

wherein $Ar_1$ and $Ar_2$ are each independently a substituted or unsubstituted arylene or hetero-arylene group with two or more aromatic rings fused together and $Ar_3$ is a substituted or unsubstituted aryl or heteroaryl group, and the polymer has a molecular weight of about 10,000 Daltons or greater.

2. The composition of claim 1, wherein $Ar_1$ and $Ar_2$ are substituted or unsubstituted naphthalenediyl, anthracenediyl or fluorenediyl.

3. The composition of claim 2, wherein $Ar_1$ and $Ar_2$ comprise a fluorene having the Formula II

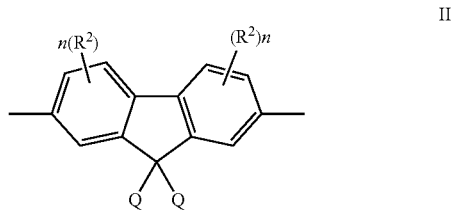

where Q is $R^1$ or Ar, wherein Ar is a aryl or heteroaryl group of $C_4$ to $C_{40}$ or substituted aryl or heteroaryl group of $C_4$ to $C_{40}$; $R^1$ is independently, in each occurrence H, $C_{1-40}$ hydrocarbyl or $C_{3-40}$ hydrocarbyl containing one or more S, N, O, P or Si atoms, or both of $R^1$ together with the 9-carbon on the fluorene may form a $C_{5-20}$ ring structure that may contain one or more S, N, Si, P or O atoms; $R^2$ is independently in each occurrence a $C_{1-40}$ hydrocarbon, $C_{3-40}$ hydrocarbyl containing one or more heteroatoms of S, N, O, P or Si, or a substituted or unsubstituted aryl group or heteroaryl group; n is independently in each occurrence, 0-3.

4. The composition of claim 1, wherein $Ar_3$ is a substituted or unsubstituted aryl or heteroaryl group of $C_4$ to $C_{40}$.

5. The composition of claim 4, wherein $Ar_3$ is an aryl or heteroaryl group having Formula III

where $R^3$ is a $C_{1\text{-}40}$ hydrocarbon, $C_{3\text{-}40}$ hydrocarbyl containing one or more heteroatoms of S, N, O, P or Si, or a substituted or unsubstituted aryl group or heteroaryl group.

6. The composition of claim 1, further comprising a solvent.

7. A film comprising the composition of claim 1.

8. The composition of claim 1, wherein the composition is blended with at least one additional conjugated polymer.

9. The composition of claim 1, wherein the composition emits light in the deep blue range of the spectrum.

10. An electroluminescent device comprising at least one organic film comprising the composition of claim 1, arranged between an anode material and a cathode material such that under an applied voltage, the organic film emits blue light which is transmitted through a transparent exterior portion of the device.

11. A field effect transistor comprising:

(a) an insulator layer, the insulator layer being an electrical insulator, the insulator layer having a first side and a second side;

(b) a gate, the gate being an electrical conductor, the gate being positioned adjacent the first side of the insulator layer;
(c) a semiconductor layer, the semiconductor layer comprising the composition of claim 1 and a second electrode;
(d) a source, the source being an electrical conductor, the source being in electrical contact with the first end of the semiconductor layer; and
(e) a drain, the drain being an electrical conductor, the drain being in electrical contact with the second end of the semiconductor layer.

12. A photocell comprising a first electrode, a film comprising the polymer of claim 1 and a second electrode.

* * * * *